(12) United States Patent
Lausenhammer et al.

(10) Patent No.: US 6,328,554 B1
(45) Date of Patent: Dec. 11, 2001

(54) VALVE GATING ARRANGEMENT FOR AN INSULATED RUNNER

(75) Inventors: Manfred Lausenhammer, Konz Rheinland-Pfalz (DE); Stanislaw Samotik, Strassen (LU)

(73) Assignee: Husky Injection Molding System, Ltd. (CA)

( * ) Notice: Subject to any disclaimer, the term of this patent is extended or adjusted under 35 U.S.C. 154(b) by 0 days.

(21) Appl. No.: 09/348,492

(22) Filed: Jul. 7, 1999

(51) Int. Cl.[7] .......................................................... A24P 1/00
(52) U.S. Cl. ............................................. 425/564; 425/566
(58) Field of Search .................................... 425/556, 562, 425/563, 564, 565, 566

(56) References Cited

U.S. PATENT DOCUMENTS

| | | |
|---|---|---|
| 3,159,878 | 12/1964 | Scott, Jr. et al. |
| 4,095,931 | 6/1978 | Reitman ............................... 425/564 |
| 4,276,015 | 6/1981 | Rogers ................................. 425/548 |
| 4,304,544 | 12/1981 | Crandell ............................... 425/594 |
| 4,378,963 * | 4/1983 | Schouenberg ........................ 425/564 |
| 4,711,625 | 12/1987 | Knauer et al. ....................... 425/549 |
| 4,771,164 * | 9/1988 | Gellert ................................. 219/421 |
| 5,037,598 | 8/1991 | Akselrud ........................... 264/328.9 |
| 5,916,605 | 6/1999 | Swenson et al. .................... 425/564 |

FOREIGN PATENT DOCUMENTS

| | | |
|---|---|---|
| 0 835 732 | 4/1998 | (EP) . |
| 57 137126 | 8/1982 | (JP) . |
| 06 126412 | 5/1994 | (JP) . |
| WO 96 27489 | 12/1996 | (WO) . |

* cited by examiner

Primary Examiner—Tim Heitbrink
(74) Attorney, Agent, or Firm—Katten Muchin Zavis

(57) ABSTRACT

A valve gating arrangement for an injection molding system having an insulated manner and a heated torpedo across from a gate. The valve gating arrangement includes a valve member sidably received within a passage extending through the torpedo. The valve member terminates at one end with a pin reciprocally movable into and out of the gate. An actuator is connected to the valve member to effect the reciprocal movement.

8 Claims, 5 Drawing Sheets

VALVE GATING ARRANGEMENT FOR AN INSULATED RUNNER

FIELD OF THE INVENTION

This invention relates generally to plastic injection molding systems. More specifically, this invention relates to insulated runner systems and in particular, to the commencement and cessation of melt flow at a gate associated with such runner systems.

BACKGROUND OF THE INVENTION

There are two basic types of hot runner molds, namely, insulated runner molds and true hot runner molds. In an insulated runner mold, an unheated runner extends between a machine nozzle and a mold cavity. In use, molten plastic ("melt") flows from the nozzle through the runner into a space defined between respective mold faces of a mold cavity and a mold core to form a part. During use, a portion of the plastic solidifies adjacent the runner walls and acts as an insulator for a molten core of plastic, hence the term "insulated runner".

Immediately adjacent the mold face of the mold cavity is an aperture referred to as a "gate" through which melt exits the insulated runner to form the part. It is of course necessary to interrupt flow through the gate for mold opening and stripping portions of an injection molding cycle. In insulated runner systems, melt is generally allowed to "freeze" in the gate prior to mold opening. Early systems would re-open the gate by pushing the frozen "slug" of plastic into the next part by incoming melt which would also melt the slug.

More recently developed systems use a nozzle heater, generally referred to by persons skilled in such devices as a "torpedo" to better control melt temperature adjacent the gate. The torpedo is situated in an area referred to as a "runner drop" at a gate end of the insulated runner. The use of a heated torpedo allows longer cycle times by extending the critical time in which freezing could occur which would require "restarting" of the molding process.

A drawback to insulated runner systems is the presence of a "vestige" on the part in the vicinity of the gate and "stringing" which result from melt in the gate adhering to the part during mold opening. In order to produce more acceptable gate vestiges, the gate should ideally be closeable other than by a slug of plastic after injection and before mold separation. Various arrangements have been devised to date. Each has its drawbacks.

U.S. Pat. No. 3,159,878 to Scott teaches an insulated runner mold that uses a moveable core plug in the mold to keep the gate closed until sufficient pressure has built up inside the runner to overcome the closing force of the plug thereby "blasting open" the gate to rapidly fill a thin wall container mold.

U.S. Pat. No. 5,037,598 to Akselrud teaches a moveable heated torpedo in an insulated runner drop that acts as a gate valve. However, to open the gate the torpedo is advanced toward the gate to melt the cold slug therein and thereafter the torpedo is retracted to allow melt to flow. When the mold is filled the gate remains open and freezes off, it is not closed by advancing the torpedo.

Both these approaches produce gate vestiges on the part the size of which are a function of gate diameter. The larger the diameter the larger the vestige. Large gate diameters promote good flow and rapid filling of the mold cavity when high viscosity, or filled resins are being processed. In contrast smaller gate diameters, which give smaller vestiges, make filling slower and more difficult for filled resins and for making thin walled parts.

It is an object of the present invention to provide a valve gated insulated runner to enable maximization of gate opening while substantially eliminating the gate vestige to produce a substantially blemish free part in any application.

SUMMARY OF THE INVENTION

A valve gating arrangement for an injection molding system having an insulated runner terminating in a gate through which melt is dischargeable into a space defined between a mold core and a mold cavity. The valve gating arrangement includes a fixed torpedo having a heated tip and a passage extending longitudinally therethrough. The heated tip extends into the insulated runner adjacent the gate. A valve member with a valve stem is slidably received in the passage. The valve member has a pin reaching from the valve stem into the gate. The valve member is reciprocally slidable between a closed configuration and an open configuration. In the closed configuration the pin extends into the gate to block melt flow. In the open configuration the pin is withdrawn from the gate to permit melt flow therethrough. An actuator is connected to the valve member for moving the valve member between the open and closed configurations.

The actuator may be a pneumatically operable piston.

A thermocouple may be provided in the heated tip to monitor melt temperature in the vicinity of the gate.

DESCRIPTION OF THE DRAWINGS

Preferred embodiments of the present invention are described below with reference to the accompanying drawings in which.

DESCRIPTION OF PREFERRED EMBODIMENTS

Figure 1A:
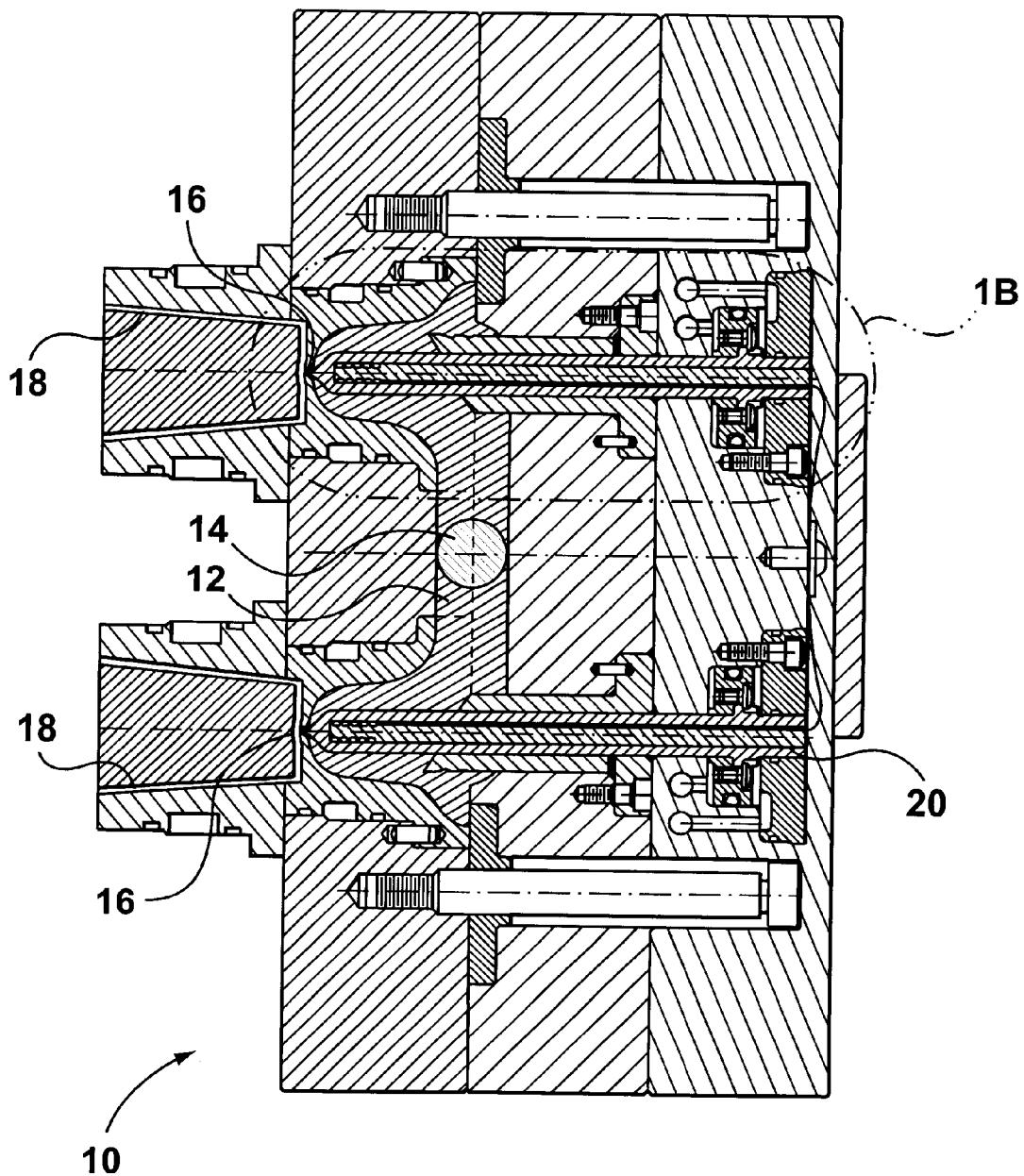
FIG. 1A is a sectional view through a prior art insulated runner mold having a fixed heated torpedo.
Figure 1B:
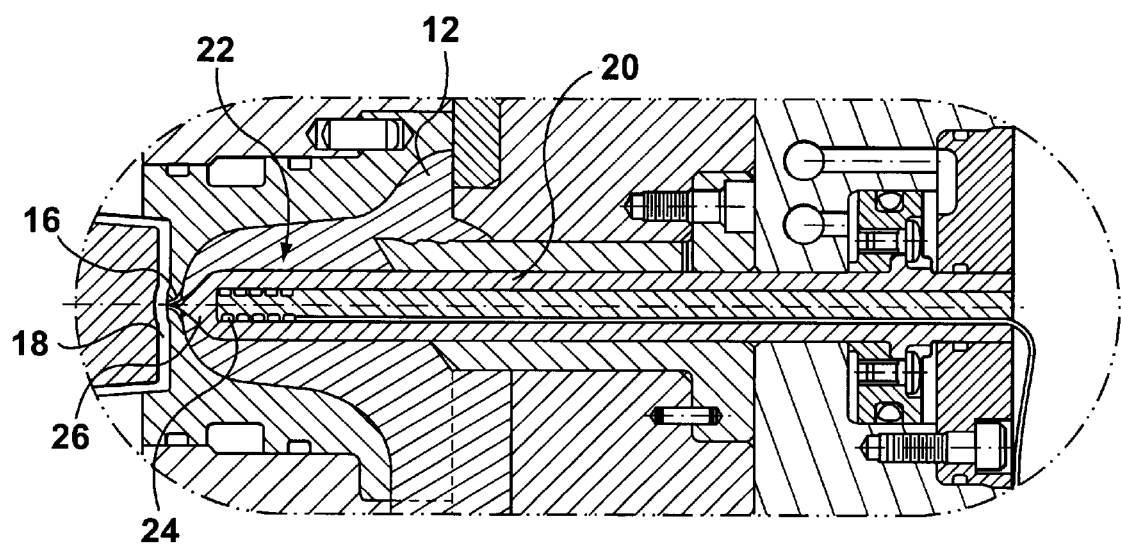
FIG. 1B is an enlargement of the area indicated by reference 1B in FIG. 1A.

FIGS. 1A and 1B are illustrative of a conventional insulated runner mold arrangement generally indicated by reference 10 in FIG. 1A. An insulated runner 12 has an inlet 14 and is illustrated as supplying two gates 16, each of which supplies melt for the molding of respective parts 18. Although two gates 16 and parts 18 are illustrated, persons skilled in such arrangements will appreciate that other numbers are feasible.

A heated torpedo 20 extends into a runner drop 22 adjacent each gate 16. The torpedo 20 has a a heater 24 adjacent a tip 26 which provides heat in an amount sufficient to permit melt flow. This arrangement, which is discussed in the background above, relies on melt solidification rather than valve gating to interrupt melt flow.

Figure 2A:
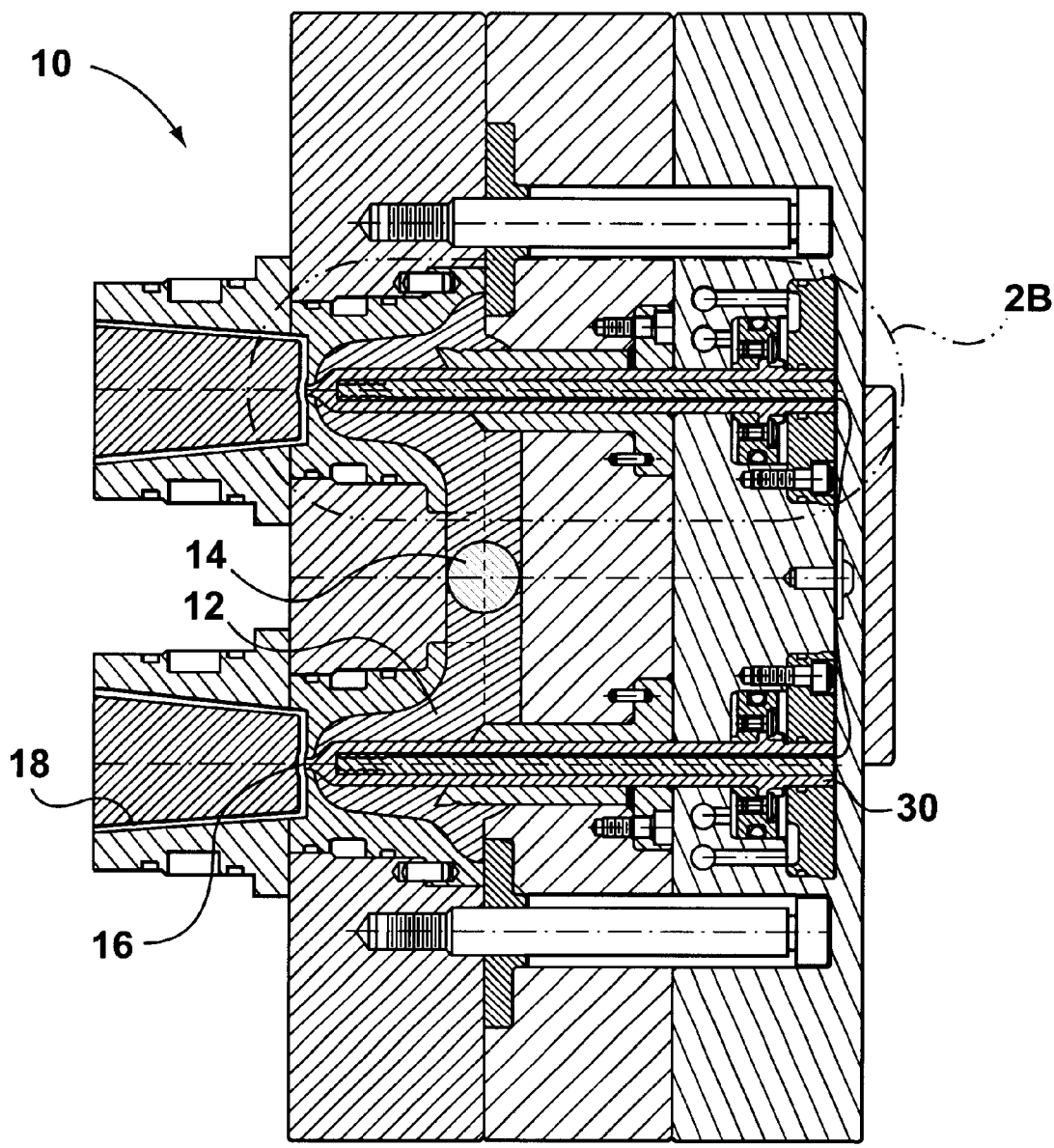
FIG. 2A is a sectional view through a prior art insulated runner mold having a movable heated torpedo.
Figure 2B:
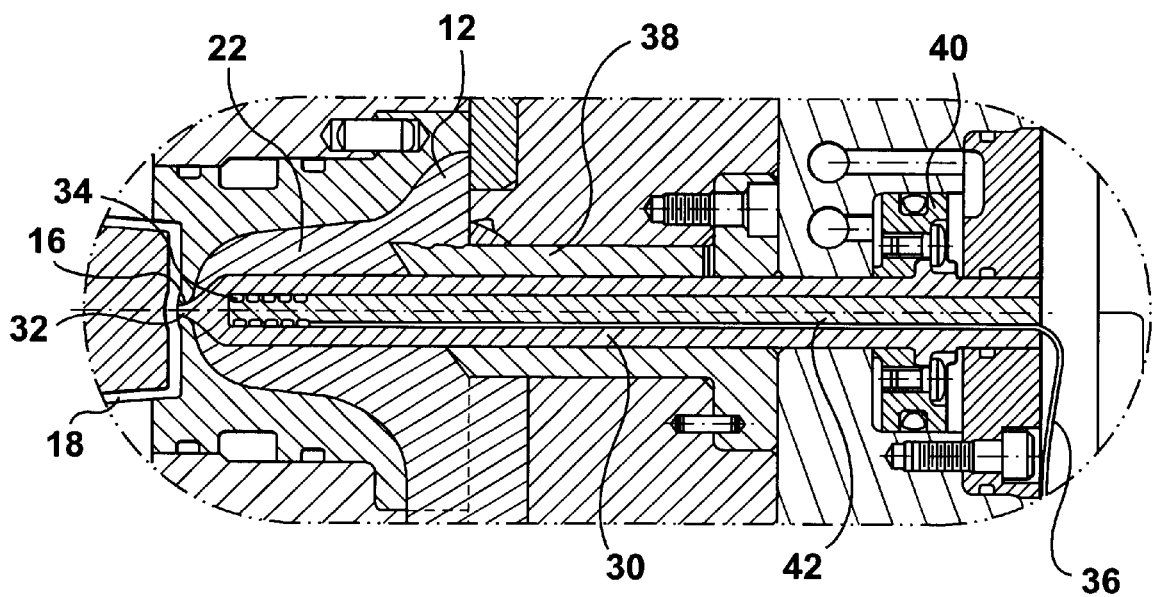
FIG. 2B is an enlargement of the area indicated by reference 2B in FIG. 1A; and, FIG. 3 is a sectional view through a valve gated runner mold according to the present invention.

FIGS. 2A and 2B illustrate an arrangement in which a movable torpedo 30 is utilized for valve gating. Insofar as the structure illustrated in FIGS. 2A and 2B is similar to the structure illustrated in FIGS. 1A and 1B, similar reference numerals have been used and the above description applies.

The torpedo 30 has a tip 32 heated by a heater 34. Electrical leads 36 extend from the heater 34 along an inside of the torpedo 34 and exit the torpedo 30 to the right as illustrated. The electrical leads 36 provide power to the heater 34.

The torpedo 30 is slidably mounted in a bushing 38 to allow axial movement of the torpedo 34. A double acting pneumatically actuatable piston 40 is connected to the torpedo 30 to cause axial movement of the torpedo 30 as indicated by the arrows at reference 42. The movement of the torpedo 30 by the piston 40 causes the tip 32 of the torpedo 30 to move into and out of the gate 16 to respectively close and open the gate 16.

Although the FIGS. 2A and 2B arrangement does provide a good vestige it does have certain drawbacks. Firstly, it has a relatively large diameter as it must act both as a heater and as a valve. Secondly, as the torpedo 30 is hot, it is prone to back leakage between it and the bushing 38. Finally, the electrical leads 36 move with each back and forth cycle of the torpedo 30 thereby giving rise to frequent electrical failures.

Figure 3:
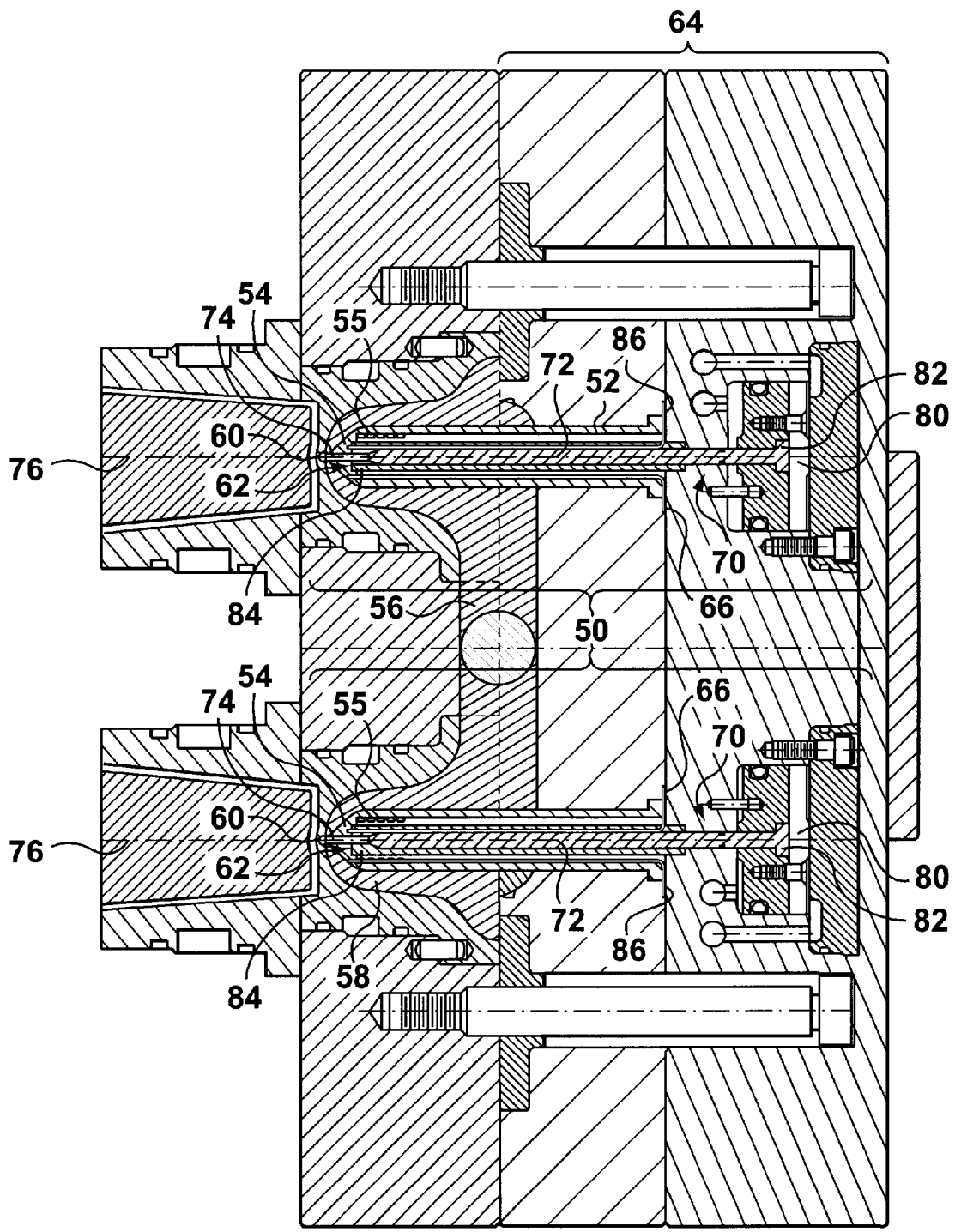

A valve gating arrangement according to the present invention is generally indicated by reference 50 in FIG. 3. The valve gating arrangement 50 includes a torpedo 52 having a heated tip 54 extending into an insulated runner 56 in a runner drop 58 adjacent a gate 60. A passage 62 extends longitudinally through the torpedo 52.

The torpedo is fixed in that it is securely mounted to a mold base 64 so as to be immovable relative to the gate 60. Electrical leads 66 extend from the heated tip 54 providing electrical current to a tip heater 55 in the tip 54.

A valve member 70 has a stem 72 slidably received in the passage 62. The valve member 70 has a pin 74 which reaches from the valve stem 72 in the passage 62 toward the gate 60. Although the pin 74 is illustrated as being of reduced diameter this may not always be the case as the diameter of the pin 74 will depend on the breadth of the gate 60.

The valve member 70 is reciprocally slidable in the direction of arrows 76 between a closed configuration illustrated at the bottom of FIG. 3 and an open configuration illustrated at the top of FIG. 3. In the closed configuration the pin 74 extends into the gate 60 to block the gate 60. In the open configuration the pin 74 is withdrawn from the gate 60 to allow melt to flow through the gate 60.

An actuator such as a pneumatically actuatable piston 80 is connected to the valve member 70 to move the valve member 70 between the closed and open configurations. The valve member 70 is illustrated as having an actuator end 82 of the valve stem 72 distal the pin 74 connected to the piston 80.

In order to provide enhanced control of melt temperature, a thermocouple 84 may be provided in the heated tip 54 to monitor the temperature of the tip 54. Thermocouple leads 86 extend from the thermocouple 84 out of the torpedo 52.

As the torpedo 52 is fixed, the electrical leads 66 and the thermocouple leads 86 do not move back and forth as in the arrangement illustrated in FIGS. 2A and 2B above. Hence the reliability of the thermocouple 82 and the heater 55 are enhanced as lead failure is less likely.

As the torpedo 52 is fixed, it can be properly sealed to eliminate melt seepage to which the movable torpedo arrangement illustrated in FIGS. 2A and 2B is prone.

In the valve gating arrangement of the present invention, the valve member 70 is relatively slender and lightweight compared to the size and weight of a typical torpedo such as the torpedo 30 in FIGS. 2A and 2B thereby significantly reducing the reciprocating mass to be moved in and out of the gate 60.

The above description is intended in an illustrative rather than a restrictive sense. Variations may be apparent to persons skilled in injection molding apparatus without departing from the spirit and scope of the invention as defined by the claims set out below.

We claim:

1. A valve gating arrangement for an injection molding system having an insulated runner terminating in at least one gate through which melt is dischargeable into a space defined between a mold core and a mold cavity, said valve gating arrangement for each said at least one gate comprising:

a fixed torpedo having an internally heated tip and a coaxial passage extending longitudinally therethrough, said heated tip extending into said insulated runner in proximity to said gate thereby enhancing thermal control of said melt;

a valve member having a stem slidably received and supported substantially along its entire length in said coaxial passage and reaching into said gate, said valve member being reciprocally slidable between a closed configuration wherein said valve member extends into said gate to block flow of said melt and an open configuration in which said valve member is withdrawn from said gate allowing flow of said melt through said gate; and, an actuator connected to said valve member for moving said valve member between said open and closed configurations.

2. A valve gating arrangement as claimed in claim 1 wherein a thermocouple extends into said heated tip for monitoring melt temperature adjacent said gate.

3. A valve gating arrangement as claimed in claim 1 wherein:

said actuator is a pneumatically operable piston; and, said actuator is connected to an actuator end of said valve stem.

4. A valve gating arrangement as claimed in claim 3 wherein said passage is coaxial with said torpedo and with said piston.

5. A valve gating arrangement as claimed in claim 3 wherein said heated tip of said torpedo extends into a runner drop adjacent said gate.

6. A valve gating arrangement as claimed in claim 5 wherein a thermocouple extends into said heated tip for monitoring melt temperature in said runner drop.

7. A valve gating arrangement as claimed in claim 5 wherein said injection molding system has a plurality of said gates.

8. A valve gating arrangement as claimed in claim 6 wherein said injection molding system has a plurality of said gates.

* * * * *